US012309227B2

(12) United States Patent
Lyu et al.

(10) Patent No.: US 12,309,227 B2
(45) Date of Patent: May 20, 2025

(54) INTERNET OF THINGS COMMUNICATION METHOD AND APPARATUS

(71) Applicant: GUANGDONG OPPO MOBILE TELECOMMUNICATIONS CORP., LTD., Guangdong (CN)

(72) Inventors: Xiaoqiang Lyu, Dongguan (CN); Jun Zhang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 409 days.

(21) Appl. No.: 17/939,910

(22) Filed: Sep. 7, 2022

(65) Prior Publication Data
US 2023/0007083 A1 Jan. 5, 2023

Related U.S. Application Data

(63) Continuation of application No. PCT/CN2020/078620, filed on Mar. 10, 2020.

(51) Int. Cl.
*G06F 15/16* (2006.01)
*H04L 67/12* (2022.01)
(Continued)

(52) U.S. Cl.
CPC .............. *H04L 67/12* (2013.01); *G16Y 30/00* (2020.01); *H04L 69/329* (2013.01)

(58) Field of Classification Search
CPC ...................................................... H04L 67/12
See application file for complete search history.

(56) References Cited

U.S. PATENT DOCUMENTS

2016/0234628 A1\* 8/2016 Rahman ................. H04W 12/50
2016/0374133 A1\* 12/2016 Logue .................... H04W 76/14
(Continued)

FOREIGN PATENT DOCUMENTS

CN 101158974 A 4/2008
CN 102833236 A 12/2012
(Continued)

OTHER PUBLICATIONS

"Information technology—Open Connectivity Foundation (OCF) Specification—Part 1:Core specification", ISO/ IEC 30118-1: 2018, IEC, 3, Rue De Varembe, PO Box 131, CH-1211 Geneva 20, Switzerland, Nov. 19, 2018 (Nov. 19, 2018), pp. 1-262, XP082030480.
(Continued)

*Primary Examiner* — Normin Abedin
(74) *Attorney, Agent, or Firm* — Ladas & Parry, LLP (57) ABSTRACT

The present disclosure provides an Internet of Things communication method and apparatus. The method includes: receiving a resource addition request transmitted by a client, where the resource addition request is used to indicate addition of an identification of a reference resource into a collection resource on the first server; performing communication with the reference resource according to an access location of the reference resource and the identification of the reference resource; adding the identification of the reference resource into the collection resource if the communication between the first server and the reference resource is successful. In this way, before adding the reference resource, the first server first performs communication with the reference resource, and adds the identification of the reference resource into the collection resource after determining that the communication between the first server and the reference resource is successful, thereby ensuring the validity of the reference resource.

14 Claims, 4 Drawing Sheets

(51) Int. Cl.
*G16Y 30/00* (2020.01)
*H04L 69/329* (2022.01)

(56) References Cited

U.S. PATENT DOCUMENTS

2019/0222656 A1    7/2019  Cao et al.
2020/0127988 A1*   4/2020  Bradley .............. H04L 63/0428

FOREIGN PATENT DOCUMENTS

| CN | 106413124 A | 2/2017 |
|----|-------------|--------|
| CN | 109600266 A | 4/2019 |
| CN | 110731074 A | 1/2020 |
| CN | 110798513 A | 2/2020 |
| JP | 2005267619 A | 9/2005 |
| JP | 2010033277 A | 2/2010 |
| JP | 2015535987 A | 12/2015 |
| JP | 2016509313 A | 3/2016 |
| WO | 2021179168 A1 | 9/2021 |

OTHER PUBLICATIONS

The EESR of corresponding European application No. 20924027.4, dated Feb. 21, 2023.
The first Office Action of corresponding Japanese application No. 2022-554736, dated Nov. 28, 2023 and its English translation provided by foreign associate.
International Search Report (ISR) dated Dec. 11, 2020 for Application No. PCT/CN2020/078620, and its English translation provided by WIPO.
Written Opinion (WOSA) dated Dec. 11, 2020 for Application No. PCT/CN2020/078620, and Its English translation provided by Google Translate.
Ericsson, Coexistence of NB-IoT with NR, 3GPP TSG RAN WG1 Meeting #96bis, R1-1903894, Xi'an, China, Apr. 8-12, 2019, all pages.

* cited by examiner

INTERNET OF THINGS COMMUNICATION METHOD AND APPARATUS

CROSS-REFERENCE TO RELATED APPLICATION

The present disclosure is a continuation of International Application No. PCT/CN2020/078620, filed on Mar. 10, 2020, which is hereby incorporated by reference in its entirety.

TECHNICAL FIELD

The present disclosure relates to the field of communication technologies, and in particular, to an Internet of Things communication method and apparatus.

BACKGROUND

In the architecture of an Internet of Things system, all physical objects can be described as resources. For example, a refrigerator is a resource, and a switch of the refrigerator is also a resource. Among resources, there is a type of collection resources which can contain references to other resources, and such referred resources are called "reference resources".

In the related art, when a resource is added to a collection resource, it is only required that the reference resource indicated by the resource already exists, without specifying how to verify the validity of the reference resource.

However, the reference resource and the collection resource may be on different devices, and the collection resource may need to access to the reference resource through network communication, the reference resource may thus be caused to be invalid due to problems such as the inability to establish a secure session without a corresponding certificate and the lack of access rights to the reference resource.

SUMMARY

Embodiments of the present disclosure provide an Internet of Things communication method and apparatus.

A first aspect of the present disclosure provides an Internet of Things communication method, applied to a first server and including:
  receiving a resource addition request transmitted by a client, the resource addition request being used to indicate addition of an identification of a reference resource into a collection resource on the first server;
  performing communication with the reference resource according to an access location of the reference resource and the identification of the reference resource;
  adding the identification of the reference resource into the collection resource if the communication between the first server and the reference resource is successful.

A second aspect of the present disclosure provides an Internet of Things communication method, applied to a client and including:
  transmitting a resource addition request to a first server, the resource addition request being used to indicate addition of an identification of a reference resource into a collection resource on the first server.

A third aspect of the present disclosure provides an Internet of Things communication method, applied to a second server and including:
  receiving a communication request transmitted by a first server, the communication request including an access location of a reference resource and an identification of the reference resource, and the reference resource being located on the second server;
  controlling the reference resource to communicate with the first server according to the access location of the reference resource and the identification of the reference resource.

A fourth aspect of the present disclosure provides an Internet of Things communication apparatus, including:
  a receiving module, configured to receive a resource addition request transmitted by a client, the resource addition request being used to indicate addition of an identification of a reference resource into a collection resource on the Internet of Things communication apparatus;
  a processing module, configured to perform communication with the reference resource according to an access location of the reference resource and the identification of the reference resource, and add the identification of the reference resource into the collection resource if the communication between the Internet of Things communication apparatus and the reference resource is successful.

A fifth aspect of the present disclosure provides an Internet of Things communication apparatus, including:
  a transmitting module, configured to transmit a resource addition request to a first server, the resource addition request being used to indicate addition of an identification of a reference resource into a collection resource on the first server.

A sixth aspect of the present disclosure provides an Internet of Things communication apparatus, including:
  a receiving module, configured to receive a communication request transmitted by a first server, the communication request including an access location of a reference resource and an identification of the reference resource, and the reference resource being located on the Internet of Things communication apparatus;
  a processing module, configured to control the reference resource to communicate with the first server according to the access location of the reference resource and the identification of the reference resource.

A seventh aspect of the present disclosure provides a server, the server includes: a processor, a memory, a transmitter and a receiver; the transmitter and the receiver are coupled to the processor, and the processor controls a transmitting action of the transmitter, and the processor controls a receiving action of the receiver;
  where the memory is configured to store computer executable program codes, and the program codes include information; when the processor executes the information, the information enables the server to execute the Internet of Things communication method provided by the first aspect or the third aspect.

An eighth aspect of the present disclosure provides a client, the client includes: a processor, a memory, a transmitter and a receiver; the transmitter and the receiver are coupled to the processor, and the processor controls a transmitting action of the transmitter, and the processor controls a receiving action of the receiver;
  where the memory is configured to store computer executable program codes, and the program codes include information; when the processor executes the information, the information enables the client to execute the Internet of Things communication provided by the second aspect.

A ninth aspect of the present disclosure provides a chip, including: a processor configured to call and run a computer program from a memory, so that a device installed with the chip executes the Internet of Things communication method provided by the implementations of the first aspect.

A tenth aspect of the present disclosure provides a chip, including: a processor configured to call and run a computer program from a memory, so that a device installed with the chip executes the Internet of Things communication method provided by the implementations of the second aspect.

An eleventh aspect of the present disclosure provides a chip, including: a processor configured to call and run a computer program from a memory, so that a device installed with the chip executes the Internet of Things communication method provided by the implementations of the third aspect.

A twelfth aspect of the present disclosure provides a computer-readable storage medium for storing a computer program, where the computer program enables a computer to execute the Internet of Things communication method provided by the implementations of the first aspect.

A thirteenth aspect of the present disclosure provides a computer-readable storage medium for storing a computer program, where the computer program enables a computer to execute the Internet of Things communication method provided by the implementations of the second aspect.

A fourteenth aspect of the present disclosure provides a computer-readable storage medium for storing a computer program, where the computer program enables a computer to execute the Internet of Things communication method provided by the implementations of the third aspect.

A fifteenth aspect of the present disclosure provides a computer program product including computer program information, wherein the computer program information enables a computer to execute the Internet of Things communication method provided by the implementations of the first aspect.

A sixteenth aspect of the present disclosure provides a computer program product including computer program information, where the computer program information enables a computer to execute the Internet of Things communication method provided by the implementations of the second aspect.

A seventeenth aspect of the present disclosure provides a computer program product including computer program information, where the computer program information enables a computer to execute the Internet of Things communication method provided by the implementations of the third aspect.

An eighteenth aspect of the present disclosure provides a computer program, where the computer program enables a computer to execute the Internet of Things communication method provided by the implementations of the first aspect.

A nineteenth aspect of the present disclosure provides a computer program, where the computer program enables a computer to execute the Internet of Things communication method provided by the implementations of the second aspect.

A twentieth aspect of the present disclosure provides a computer program, where the computer program enables a computer to execute the Internet of Things communication method provided by the implementations of the third aspect.

In the Internet of Things communication method and apparatus provided by the embodiments of the present disclosure, a first server receives a resource addition request transmitted by a client, the resource addition request being used to indicate addition of an identification of a reference resource into a collection resource on the first server. Subsequently, the first server performs communication with the reference resource according to an access location of the reference resource and the identification of the reference resource. If the communication between the first server and the reference resource is successful, the first server adds the identification of the reference resource into the collection resource. In this way, before adding the reference resource, the first server first performs communication with the reference resource, and adds the identification of the reference resource into the collection resource after determining that the communication between the first server and the reference resource is successful.

BRIEF DESCRIPTION OF DRAWINGS

To describe the technical solutions in embodiments of the present disclosure or in the prior art more clearly, in the following, the accompanying drawings needed for describing the embodiments or the prior art are introduced briefly. Apparently, the accompanying drawings in the following description illustrate merely some embodiments of the present disclosure, and persons of ordinary skill in the art may still derive other drawings from these accompanying drawings without paying creative effort.

DESCRIPTION OF EMBODIMENTS

To make the objectives, technical solutions, and advantages of embodiments of the present disclosure clearer, in the following, the technical solutions in embodiments of the present disclosure will be described clearly and comprehensively with reference to the accompanying drawings in the embodiments of the present disclosure. Apparently, the described embodiments are merely a part rather than all embodiments of the present disclosure. All other embodiments obtained by persons of ordinary skill in the art based on embodiments of the present disclosure without paying creative effort shall fall within the protection scope of the present disclosure.

In the architecture of an Internet of Things system, all physical objects can be described using resources. For example, a refrigerator is a resource, and a switch of the refrigerator is also a resource. Among resources, there is a type of collection resources which can contain references to other resources, and such reference resources are called "reference resources".

In the prior art, when a resource is added to a collection resource, it is only required that the reference resource indicated by the resource already exists, without specifying how to verify the validity of the reference resource.

However, the reference resource and the collection resource may be on different devices, and the collection resource may need to access to the reference resource through network communication, the reference resource may thus be caused to be invalid due to problems such as the inability to establish a secure session without a corresponding certificate and the lack of access rights to the reference resource.

In order to solve the above problems and avoid the invalidation of reference resources, in the present disclosure, when adding an identification of a reference resource into a collection resource, a client first performs communication with the reference resource to determine that the reference resource is valid, thereby avoiding the invalidity of the reference resource.

Figure 1:
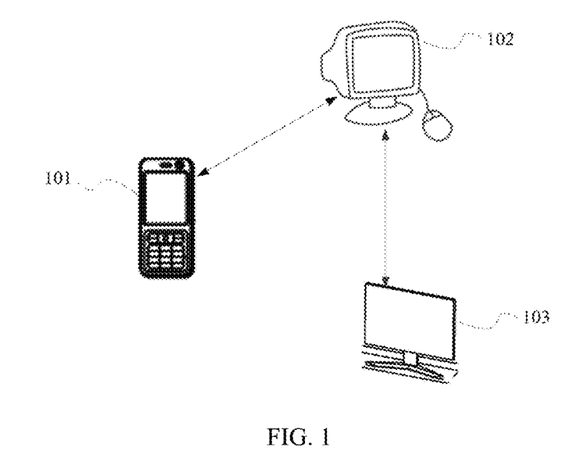
FIG. 1 is a schematic diagram of a scenario of an Internet of Things communication method provided by an embodiment of the present disclosure.

FIG. 1 is a schematic diagram of a scenario of an Internet of Things communication method provided by an embodiment of the present disclosure. As shown in FIG. 1, a client 101, a first server 102 and a second server 103 are connected to each other to form the Internet of Things. A user operates the client 101 to transmit a resource addition request to the first server 102, so as to add a reference resource to a resource collection of the first server 101. The above reference resource may be a resource of the first server 102 or a resource of the second server 103.

Where the client 101, the first server 102 and the second server 103 may be referred to as terminals, user equipment (UE), mobile stations (MS), and mobile terminals (MT), and may also be mobile phones, tablet computers (pad), computers with wireless transceiving functions, virtual reality (VR) terminal devices, augmented reality (AR) terminal devices, wireless terminals in industrial control, wireless terminals in self driving, wireless terminals in remote medical surgery, wireless terminals in smart grid, wireless terminals in smart home, etc.

The resources may be physical objects or functional objects in the first server 102 and the second server 103. Exemplarily, if the server is a refrigerator, then the reference resource may be a switch of the refrigerator, a lamp in the refrigerator, and the like. Exemplarily, if the server is a TV, then the reference resource may be a switch of the TV, a volume button of the TV, and the like.

A reference resource is a collection resource and can include references to other resources.

A resource collection includes one or more uniform resource locators (URI) of the reference resource. Where one of the attributes in the resource collection is a resource link list attribute.

It should be noted that the scenario shown in FIG. 1 is only an achievable scenario for resource referencing, the Internet of Things communication method involved in the embodiments of the present disclosure may be applied in a variety of Internet of Things systems, and the embodiments of the present disclosure does not limit the available Internet of Things systems.

In the following, detailed description of the technical solution of the embodiments of the present disclosure is made by taking the first server as an example with reference to specific embodiments. The following specific embodiments may be combined with each other, the same or similar concepts or processes may not be repeated in certain embodiments.

Figure 2:
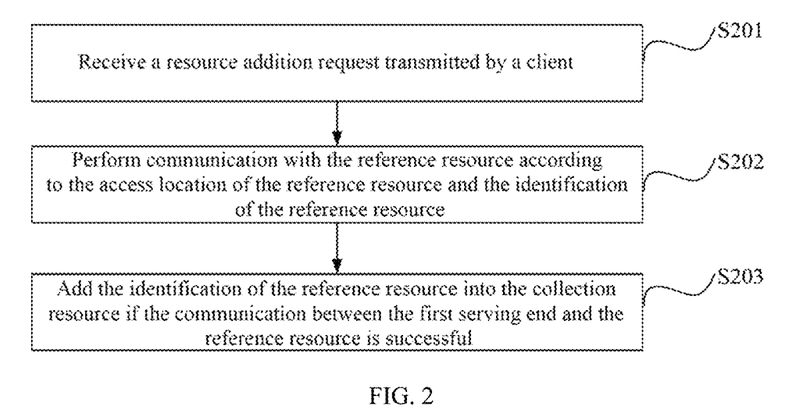
FIG. 2 is a schematic flowchart of an Internet of Things communication method provided by an embodiment of the present disclosure.

FIG. 2 is a schematic flowchart of an Internet of Things communication method provided by an embodiment of the present disclosure. The execution subject of the embodiment of the present disclosure is a server, and a specific process of how the server adds a reference resource is involved. As shown in FIG. 2, the method includes:

S201: receive a resource addition request transmitted by a client, where the resource addition request is used to indicate addition of an identification of a reference resource into a collection resource on the first server.

Where the reference resource may be a resource on the first server which receives the resource addition request, and may also be a resource on other servers, such as a resource on a second server, which is not limited in the embodiments of the present disclosure.

In some embodiments, the resource addition request includes an identification of the reference resource. Exemplarily, the identification of the reference resource may be a value of di, and the value of di may be contained in an href attribute, or, contained in an anchor attribute.

The href attribute is a required attribute for resource links, and may be a target URI, that is, the reference resource of the resource addition request, the reference resource may be a relative path or an absolute path. di is an ID of a server where the reference resource is located. anchor is a context URI.

In some embodiments, the resource addition request may include an access location of the reference resource, or may not include an access location of the reference resource. Exemplarily, the access location of the reference resource can be an eps attribute, where the eps attribute may include an internet protocol (IP) address and a port number of the reference resource.

In some embodiments, if the resource addition request does not contain the access location of the reference resource, the first server searches for the reference resource in a network to obtain the access location of the reference resource.

Exemplarily, if the resource addition request does not carry the eps attribute, then at this time the first server needs to actively search for resources in the network to obtain the eps of the reference resource. If the di of the searched resource is consistent with the di in the resource addition request, the URI of the searched resource is consistent with a value of the href attribute in the resource addition request, and a value of an rt attribute and a value of an if attribute of the searched resource are consistent with values of corresponding attributes in the resource addition request, then the eps of the searched resource will be used as the eps of the reference resource. Where the value of the rt attribute is a resource type identification of the reference resource and the value of the if attribute is a set of interfaces supported by the reference resource. If the reference resource is not searched by the first server in the network, an error prompt is returned to the client.

In at least one embodiment, after receiving the resource addition request, the first server can also check whether the resource addition request is legal. Exemplarily, the first server may check whether the resource addition request contains a required parameter, or, check whether a type of data in the resource addition request is correct. If the resource addition request is illegal, the first server can transmit an error prompt to the client.

S202: perform communication with the reference resource according to the access location of the reference resource and the identification of the reference resource.

In this step, after receiving the resource addition request transmitted by the client, the first server can perform communication with the reference resource according to the access location of the reference resource and the identification of the reference resource.

In some embodiments, the first server may determine the server where the reference resource is located and a resource corresponding to the reference resource on the server, based on the access location of the reference resource and the identification of the reference resource.

The embodiments of the present disclosure do not limit how the first server performs communication with the reference resource, which may be based on the existing communication means. In at least one embodiment, the first server may transmit a communication request to the second server, and establish a communication connection between the first server and the reference resource according to the access location of the reference resource and the identification of the reference resource; subsequently, the first server performs communication with the reference resource according to the communication connection between the first server and the reference resource.

Exemplarily, the server uses the eps attribute and the href attribute in the resource addition request to create a datagram transport layer security (DTLS) secure session, and the first server performs communication with the reference resource based on the DTLS secure session. Subsequently, the first server to transmits an obtaining request or an updating request to the reference resource, and performs communication with the reference resource for one or more times.

S203: add the identification of the reference resource into the collection resource if the communication between the first server and the reference resource is successful.

In this step, after performing communication with the reference resource, if the communication between the first server and the reference resource is successful, the first server adds the identification of the reference resource into the collection resource.

In some embodiments, if the first server performs multiple times of communication connecting with the reference resource, there is one successful communication, then the first server adds the identification of the reference resource into the collection resource.

Where the identification of the reference resource can be a link of the reference resource.

The embodiments of the present disclosure do not limit how to add the identification of the reference resource into the collection resource, which can be done according to the existing method for adding an identification of a reference resource.

In some embodiments, if the communication between the first server and the reference resource fails, send an addition failure response to the client.

Exemplarily, if the communication between the first server and the reference resource fails, the addition failure response may include error return, communication failure, and the like.

In the Internet of Things communication method provided by the embodiment of the present disclosure, a first server receives a resource addition request transmitted by a client, and the resource addition request is used to indicate addition of an identification of a reference resource into a collection resource on the first server. Subsequently, the first server performs communication with the reference resource according to an access location of the reference resource and the identification of the reference resource, and adds the identification of the reference resource into the collection resource if the communication between the first server and the reference resource is successful. In this way, before adding the reference resource, the first server first performs communication with the reference resource, and then adds the identification of the reference resource into the collection resource after determining that the communication between the first server and the reference resource is successful, thereby ensuring the validity of the reference resource.

On the basis of the above embodiment, the above resource addition request may be a local link of the first server, or a remote link for other servers. For the local link, the first server may employ the Internet of Things communication method in the above embodiment, however, since the reference resource and the collection resource are usually on the same device, so for the local link, in general, the collection resource can be directly verified within a software program to access to the reference resource. Therefore, when referencing a resource, it is possible to first determine whether the resource addition request is a remote link or a local link, and for the remote link, it is possible to use the above-mentioned Internet of Things communication method, since for the local link, verification can be done directly within the software program to access to the reference resource.

Figure 3:
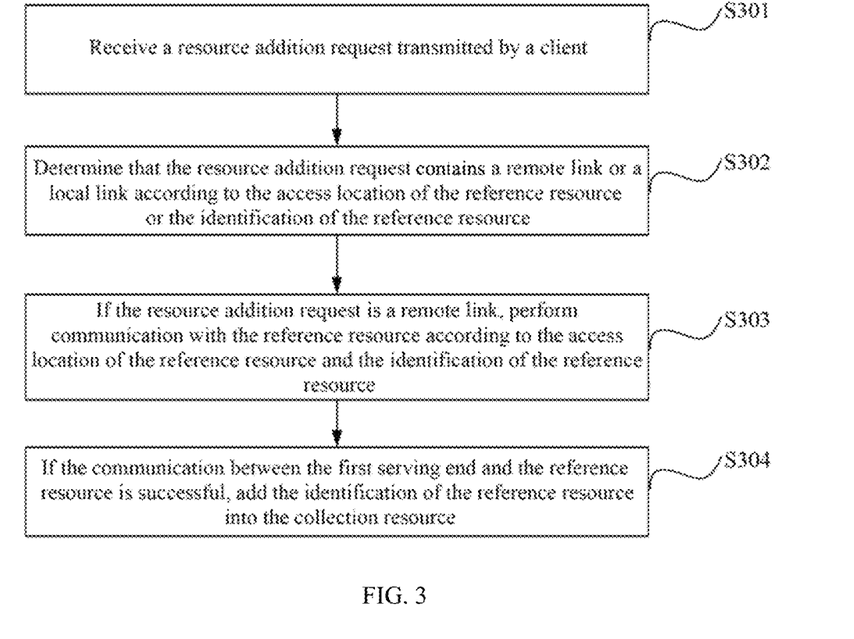
FIG. 3 is a schematic flowchart of another Internet of Things communication method provided by an embodiment of the present disclosure.

FIG. 3 is a schematic flowchart of another Internet of Things communication method provided by an embodiment of the present disclosure. Based on the above embodiment, the present embodiment relates to how to determine that the resource addition request is a remote link or a local link, as shown in FIG. 3, the Internet of Things communication method includes:

S301: receive a resource addition request transmitted by a client, where the resource addition request is used to indicate addition of an identification of a reference resource into a collection resource on the first server.

Technical terms, technical effects, technical features, and at least one embodiment in S301 may be understood with reference to S201 shown in FIG. 2, which will not be repeated here for the sake of brevity.

S302: determine that the resource addition request is a remote link or a local link according to an access location of the reference resource or the identification of the reference resource.

In this step, when receiving a resource addition request transmitted by the client, the first server can also determine that the resource addition request contains a remote link or a local link according to the access location of the reference resource or the identification of the reference resource.

In some embodiments, if the identification of the reference resource is different from an identification of the first server, determine that the resource addition request is a remote link, or, if the identification of the reference resource is the same as the identification of the first server, determine that the resource addition request is a local link.

Exemplarily, if the resource addition request contains a value of di, when the value of di is consistent with the first server's own device ID, determine that the resource addition request is a local link, and when the value of di is inconsistent with the first server's own device ID, determine that the link is a remote link.

Exemplarily, if the resource addition request contains an anchor attribute, and the anchor attribute contains a value of di, when the value of di is consistent with the first server's own device ID, determine that the resource addition request is a local link, and when the value of di is inconsistent with the first server's own device ID, determine that the resource addition request is a remote link.

Exemplarily, if the resource addition request contains an href attribute, and the href attribute contains a value of di, when the value of di is consistent with the first server's own device ID, determine that the resource addition request is a local link, and when the value of di is inconsistent with the first server's own device ID, determine that the resource addition request is a remote link.

In some embodiments, if the access location of the first server does not contain the access location of the reference resource, determine that the resource addition request is a remote link; if the access location of the first server contains the access location of the reference resource, determine that the resource addition request is a local link.

Exemplarily, if the resource addition request contains an eps attribute, when the eps attribute in the resource addition request is contained in the eps attribute of the first server per se, determine that the resource addition request is a local link, and when the eps attribute of the first server per se does not contain the eps attribute in the resource addition request, determine that the resource addition request is a remote link.

In some embodiments, if the identification of the reference resource is different from the identification of the first server and the access location of the first server contains the access location of the reference resource, or, if the identification of the reference resource is the same as the identification of the first server and the access location of the first server does not contain the access location of the reference resource, send first information to the client, where the first information is used to represent that the first server is incapable of determining that the resource addition request is a remote link or a local link.

Exemplarily, if the resource addition request contains more than one of the above attributes, and the above determination results are consistent, the consistent determination results are adopted, if the above determination results conflict, return the first information to the client, where the first information is used to represent that the first server is incapable of determining that the resource addition request is a remote link or a local link.

S303: if the resource addition request is a remote link, perform communication with the reference resource according to the access location of the reference resource and the identification of the reference resource.

S304: if the communication between the first server and the reference resource is successful, add the identification of the reference resource into the collection resource.

Technical terms, technical effects, technical features, and at least one embodiment in S304 may be understood with reference to S203 shown in FIG. 2, which will not be repeated here for the sake of brevity.

In the Internet of Things communication method provided by the embodiment of the present disclosure, a first server determines that a resource addition request is a remote link or a local link according to an access location of a reference resource or an identification of the reference resource. If the resource addition request is a remote link, perform communication with the reference resource according to the access location of the reference resource and the identification of the reference resource. In this way, after determining that the resource addition request is a remote link, it is possible to communicate with the reference resource first, and then add the identification of the reference resource into the collection resource after determining that the communication between the first server and the reference resource is successful, thus ensuring the validity of the reference resource.

Figure 4:
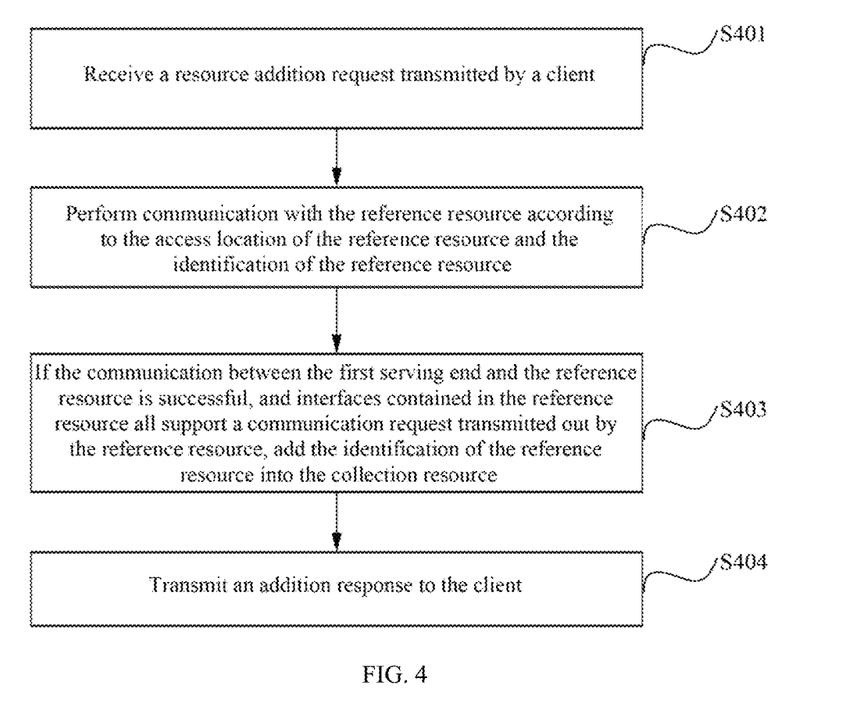
FIG. 4 is a schematic flowchart of still another Internet of Things communication method provided by an embodiment of the present disclosure.

On the basis of the above embodiment, how the first server performs communication with the client after the first server adds the identification of the reference resource into the collection resource will be described in the following. FIG. 4 is a schematic flowchart of another Internet of Things communication method provided by an embodiment of the present disclosure. As shown in FIG. 4, the Internet of Things communication method includes:

S401: receive a resource addition request transmitted by a client, where the resource addition request is used to request addition of an identification of a reference resource into a collection resource on the first server;

S402: perform communication with the reference resource according to an access location of the reference resource and the identification of the reference resource.

Technical terms, technical effects, technical features, and at least one embodiment in S401-S402 may be understood with reference to S201-S202 shown in FIG. 2, which will not be repeated here for the sake of brevity.

S403: if the communication between the first server and the reference resource is successful, and interfaces contained in the reference resource all support a communication request transmitted out by the reference resource, add the identification of the reference resource into the collection resource.

In this step, after the first server performs communication with the reference resource, if the communication between the first server and the reference resource is successful, and interfaces contained in the reference resource all support a communication request transmitted out by the reference resource, add the identification of the reference resource into the collection resource.

Exemplarily, if the communication between the first server and the reference resource is successful, it is possible to traverse each interface in interface attributes contained in the reference resource, if for each interface, verification with the reference resource on each create retrieve update delete (CRUDN) operation supported by the interface is confirmed, then interfaces contained in the reference resource all support the communication request transmitted out by the reference resource, and the first server can add the identification of the reference resource into the collection resource.

S404: transmit an addition response to the client, where the addition response includes an instance attribute of the reference resource.

In this step, after adding the identification of the reference resource into the collection resource, the first server can transmit an addition response to the client.

Where the instance attribute of the reference resource is updated by the first server.

Exemplarily, after adding the identification of the reference resource into the collection resource, the first server can return resource link data whose ins attribute has been updated to the client, where the ins attribute is an instance attribute uniquely identified in a link list.

In some embodiments, the first server may use the value of the href attribute to create a get and update request to communicate with a cloud platform for one or more times, and if a failure occurs, error information is returned to the client. If successful, in addition to updating the value of the ins attribute in the resource addition request, it is also possible to use eps information of the cloud platform to update the eps attribute in the resource addition request. The cloud platform here simply refers to a service that can be accessed by both the above-mentioned client and the first server, and its deployment manner is not limited here, the cloud platform can be a cloud service deployed in a data center, a service deployed in a local area network, or a service deployed in a cell network or a metropolitan network.

Figure 5:
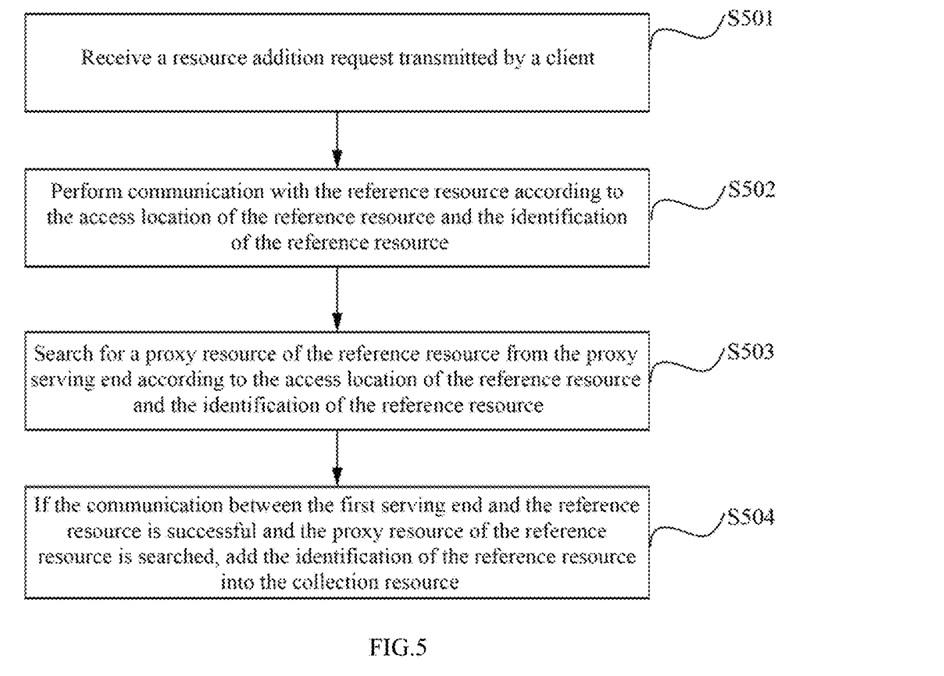
FIG. 5 is a schematic flowchart of another Internet of Things communication method provided by an embodiment of the present disclosure.

On the basis of the above embodiment, in addition that the first server can verify the validity of the reference resource by performing communication with the reference resource, a proxy server may also verify the validity of the reference resource. FIG. 5 is a schematic flowchart of another Internet of Things communication method provided by an embodiment of the present disclosure. As shown in FIG. 5, the Internet of Things communication methods includes:

S501: receive a resource addition request transmitted by a client, where the resource addition request is used to indicate addition of an identification of a reference resource into a collection resource on the first server;

S502: perform communication with the reference resource according to an access location of the reference resource and the identification of the reference resource.

Technical terms, technical effects, technical features, and at least one embodiment in S501-S502 may be understood with reference to S201-S202 shown in FIG. 2, which will not be repeated herein for the sake of brevity.

S503: search for a proxy resource of the reference resource from the proxy server according to the access location of the reference resource and the identification of the reference resource.

In this step, after performing communication with the reference resource, the first server can also search for the proxy resource of the reference resource from the proxy server according to the access location of the reference resource and the identification of the reference resource.

Exemplarily, a proxy service is implemented inside the first server, the proxy service is a proxy resource implemented by all resources in the local area network that can be accessed by the proxy service, and the proxy service needs to regularly search for resources in the local area network to achieve update of a proxy resource list. The first server can use the values of the di attribute and the href attribute to search for the corresponding proxy resource in the internal proxy service, and if the search fails, return error information to the client, and if the search is successful, it means that the reference resource of the remote link is valid for the first server, and then return resource link data whose ins attribute has been updated to the client.

S504: if the communication between the first server and the reference resource is successful and the proxy resource of the reference resource is searched, add the identification of the reference resource into the collection resource.

In the Internet of Things communication method provided by the embodiment of the present disclosure, a first server receives a resource addition request transmitted by a client, the resource addition request is used to indicate addition of an identification of a reference resource into a collection resource on the first server. Subsequently, the first server performs communication with the reference resource according to the access location of the reference resource and the identification of the reference resource. The first server searches for a proxy resource of the reference resource from the proxy server according to the access location of the reference resource and the identification of the reference resource. If the communication between the first server and the reference resource is successful and the proxy resource of the reference resource is searched, the first server adds the identification of the reference resource into the collection resource. In this way, before adding the reference resource, the first server first performs communication with the reference resource, and then adds the identification of the reference resource into the collection resource after determining that the communication between the first server and the reference resource is successful, thereby ensuring the validity of the reference resource.

Figure 6:
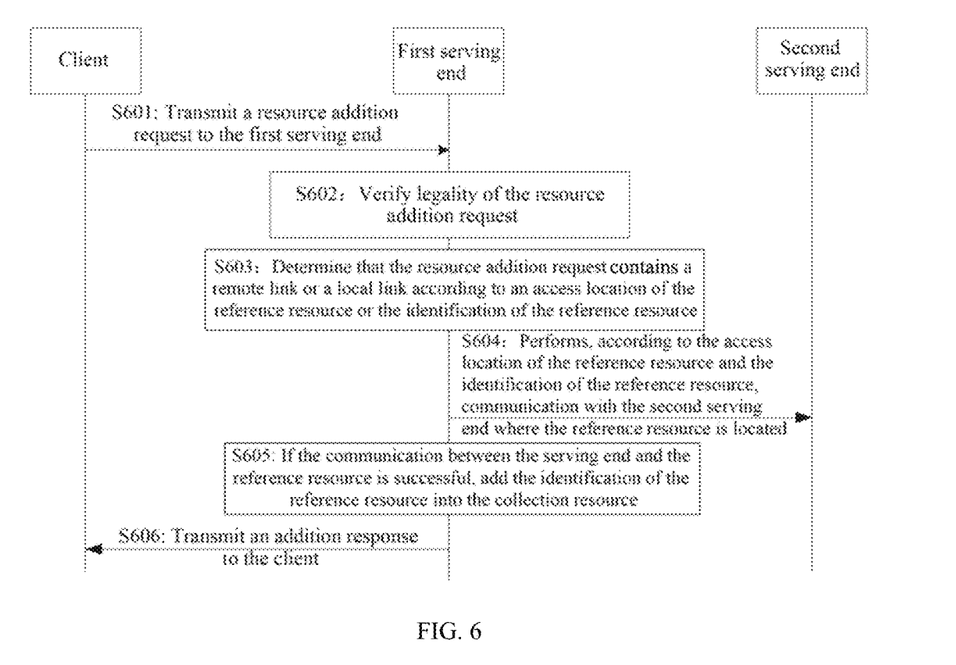
FIG. 6 is a signaling interaction diagram of an Internet of Things communication method provided by an embodiment of the present disclosure.

FIG. 6 is a signaling interaction diagram of an Internet of Things communication method provided by an embodiment of the present disclosure. Resource referencing in the embodiments of the present disclosure are based on a client, a first server and a second server. As shown in FIG. 6, the Internet of Things communication method includes:

S601: the client transmits a resource addition request to the first server, where the resource addition request is used to request addition of an identification of a reference resource into a collection resource on the first server;

S602: the first server verifies legality of the resource addition request;

S603: the first server determines that the resource addition request is a remote link or a local link according to an access location of the reference resource or the identification of the reference resource;

S604: the first server performs, according to the access location of the reference resource and the identification of the reference resource, communication with the second server where the reference resource is located;

S605: if the communication between the first server and the reference resource is successful, the first server adds the identification of the reference resource into the collection resource; and S606: the first server transmits an addition response to the client, where the addition response contains an instance attribute of the reference resource.

In the Internet of Things communication method provided by the embodiment of the present disclosure, a first server receives a resource addition request transmitted by a client, the resource addition is used to request addition of an identification of a reference resource into a collection resource on the first server. Subsequently, the first server performs communication with the reference resource according to an access location of the reference resource and the identification of the reference resource. If the communication between the first server and the reference resource is successful, the first server adds the identification of the reference resource into the collection resource. In this way, before adding the reference resource, the first server first performs communication with the reference resource, and then adds the identification of the reference resource into the collection resource after determining that the communication between the first server and the reference resource is successful, thereby ensuring the validity of the reference resource.

Those of ordinary skill in the art will appreciate that all or part of the steps for implementing the above method embodiments may be completed by program information related to hardware, and the foregoing program may be stored in a computer-readable storage medium, the program, when executed, performs steps including the above method embodiments. The aforementioned storage medium includes: an ROM, an RAM, a disk or an optical disk and other medium that can store program codes.

Figure 7:
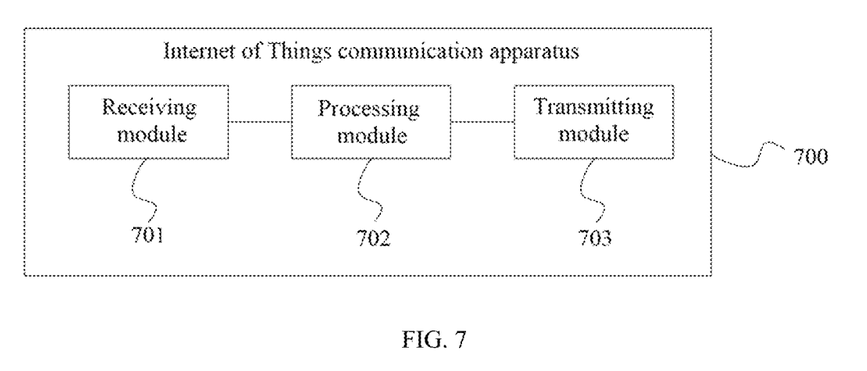
FIG. 7 is a schematic structural diagram of an Internet of Things communication apparatus according to an embodiment of the present disclosure.

FIG. 7 is a schematic structural diagram of an Internet of Things communication apparatus 700 provided by an embodiment of the present disclosure. The Internet of Things communication apparatus 700 may be implemented by software, hardware or a combination of both to perform the above-described Internet of Things communication method. As shown in FIG. 7, the Internet of Things communication apparatus 700 includes: a receiving module 701, a processing module 702, and a transmitting module 703;

the receiving module 701 is configured to receive a resource addition request transmitted by a client, where the resource addition request is used to indicate addition of an identification of a reference resource into a collection resource on the Internet of Things communication apparatus 700;

the processing module 702 is configured to perform communication with the reference resource according to an access location of the reference resource and the identification of the reference resource, and add the identification of the reference resource into the collection resource if the communication between the Internet of Things communication apparatus 700 and the reference resource is successful.

In an alternative implementation, the processing module 702 is specifically configured to establish a communication connection between the Internet of Things communication apparatus 700 and the reference resource according to the access location of the reference resource and the identification of the reference resource, and perform communication with the reference resource according to the communication connection between the Internet of Things communication apparatus 700 and the reference resource.

In at least one embodiment, the apparatus further includes:

the transmitting module 703, configured to transmit an addition failure response to the client if the communication between the Internet of Things communication apparatus 700 and the reference resource fails.

In at least one embodiment the apparatus is further configured to determine that the resource addition request contains a remote link or a local link according to the access location of the reference resource or the identification of the reference resource, and perform communication with the reference resource according to the access location of the reference resource and the identification of the reference resource if the resource addition request is a remote link.

In at least one embodiment, the processing module 702 is specifically configured to determine that the resource addition request is the remote link if the identification of the reference resource is different from an identification of the Internet of Things communication apparatus 700, or, determine that the resource addition request is the local link if the identification of the reference resource is the same as an identification of the Internet of Things communication apparatus 700.

In at least one embodiment, the processing module 702 is specifically configured to determine that the resource addition request is the remote link if the access location of the Internet of Things communication apparatus 700 does not contain the access location of the reference resource, or determine that the resource addition request is the local link if the access location of the first server contains the access location of the reference resource.

In at least one embodiment, the transmitting module 703 is further configured to: if the identification of the reference resource is different from an identification of the Internet of Things communication apparatus 700 and the access location of the Internet of Things communication apparatus 700 contains the access location of the reference resource, or if the identification of the reference resource is the same as an identification of the Internet of Things communication apparatus 700 and the access location of the Internet of Things communication apparatus 700 does not contain the access location of the reference resource, transmit the first information to the client, where the first information is used to represent that the Internet of Things communication apparatus 700 is incapable of determining that the resource addition request is a remote link or a local link.

In at least one embodiment, the processing module 702 is specifically configured to add the identification of the reference resource into the collection resource, if the communication between the Internet of Things communication apparatus 700 and the reference resource is successful and interfaces contained in the reference resource all support a communication request transmitted out by the reference resource.

At least one embodiment, the transmitting module 703 is further configured to transmit an addition response to the client, where the addition response contains an instance attribute of the reference resource.

In at least one embodiment, the instance attribute of the reference resource is updated by the Internet of Things communication apparatus 700.

In at least one embodiment, the processing module 702 is specifically configured to search for a proxy resource of the reference resource from a proxy server according to the access location of the reference resource and the identification of the reference resource, and add the identification of the reference resource into the collection resource if the communication between the Internet of Things communication apparatus 700 and the reference resource is successful and the proxy resource of the reference resource is searched.

In at least one embodiment, the resource addition request contains the access location of the reference resource.

In at least one embodiment, the processing module 702 is further configured to search for the reference resource in a network to obtain the access location of the reference resource if the resource addition request does not contain the access location of the reference resource.

In at least one embodiment, the resource addition request contains the identification of the reference resource.

The Internet of Things communication apparatus 700 provided in the embodiment of the present disclosure may perform actions of the Internet of Things communication method on the first server in the above method embodiments, and implementation principles and technical effects thereof are similar, which will not be repeated here.

The present disclosure also provides an Internet of Things communication apparatus, including: a transmitting module configured to transmit a resource addition request to a first server, the resource addition request being used to indicate addition of an identification of a reference resource into a collection resource on the first server.

In at least one embodiment, the apparatus further includes:

a receiving module, configured to receive an addition response transmitted by the first server-side, where the addition response contains an instance attribute of the reference resource.

In at least one embodiment, the instance attribute of the reference resource is updated by the first server.

In at least one embodiment, the receiving module is further configured to receive an addition failure response transmitted by the first server if communication between the first server and the reference resource fails.

In at least one embodiment, the resource addition request contains an access location of the reference resource.

In at least one embodiment, the resource addition request contains the identification of the reference resource.

The Internet of Things communication apparatus provided in the embodiment of the present disclosure may perform actions of the Internet of Things communication method on the client side in the above method embodiments, and implementation principles and technical effects thereof are similar, which will not be repeated here.

The present disclosure also provides an Internet of Things communication device, including: a receiving module configured to receive a communication request transmitted by a first server, the communication request including an access location of a reference resource and an identification of the reference resource, and the reference resource being located on the Internet of Things communication apparatus;

a processing module, configured to control the reference resource to communicate with the first server according to the access location of the reference resource and the identification of the reference resource.

In at least one embodiment, the processing module is specifically configured to establish a communication connection between the first server and the reference resource according to the access location of the reference resource and the identification of the reference resource, and perform communication with the reference resource according to the communication connection between the first server and the reference resource.

The Internet of Things communication apparatus provided in the embodiment of the present disclosure may perform actions of the Internet of Things communication method on the second server in the above method embodiment, and implementation principles and technical effects thereof are similar, which will not be repeated here.

Figure 8:
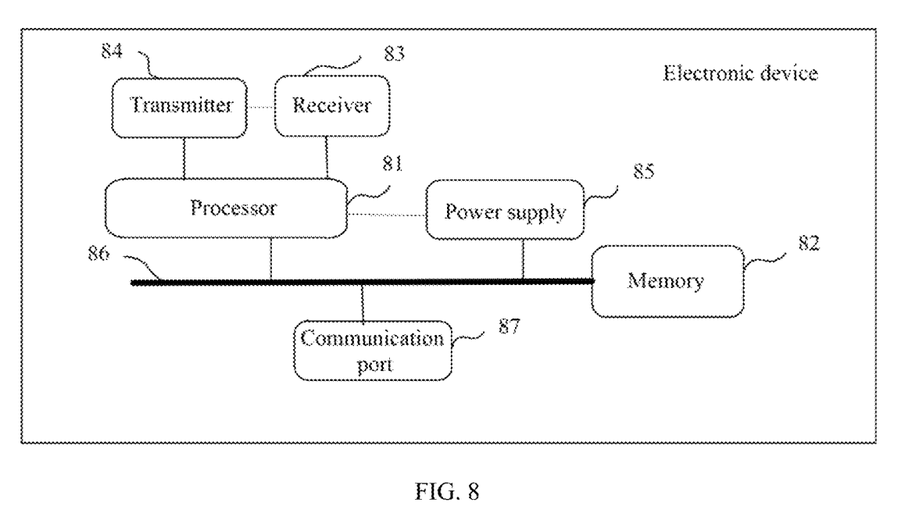
FIG. 8 is a schematic structural diagram of an electronic device according to an embodiment of the present disclosure.

FIG. 8 is a schematic structural diagram of an electronic device provided by an embodiment of the present disclosure. As shown in FIG. 8, the electronic device may include: a processor 81 (for example, a CPU), a memory 82, a receiver 83 and a transmitter 84; the receiver 83 and the transmitter 84 are coupled to the processor 81, and the processor 81 controls a receiving action of the receiver 83, and the processor 81 controls a transmitting action of the transmitter 84. The memory 82 may include a high-speed RAM memory, and may also include a non-volatile memory NVM, for example, at least one disk memory, and the memory 82 may store various information, so as to complete various processing functions and to implement method steps in the embodiments of the present disclosure. In at least one embodiment, the electronic device in the embodiments of the present disclosure may further include: a power supply 85, a communication bus 86, and a communication port 87. The receiver 83 and the transmitter 84 may be integrated in a transceiver of the electronic device, or may be a separate transceiver antenna on the electronic device. The communication bus 86 is used to implement communication connections among elements. The communication port 87 is used to achieve connection communication between the electronic device and other peripherals.

In the embodiments of the present disclosure, the above memory 82 is configured to store computer executable program codes, the program codes include information; when the processor 81 executes the information, the information causes the processor 81 to perform the processing action on the first server in the above method embodiments, so that the transmitter 84 performs the transmitting action on the first server in the above method embodiments and the receiver 83 performs the receiving action on the first server in the above method embodiments. The implementation principles and technical effects thereof are similar, and will not be repeated here.

Alternatively, when the processor 81 executes the information, the information causes the processor 81 to perform the processing action on the client side in the above method embodiments, so that the transmitter 84 performs the transmitting action on the client side in the above method embodiments and the receiver 83 performs the receiving action on the client side in the above method embodiments. The implementation principles and technical effects are similar, and will not be repeated here.

Alternatively, when the processor 81 executes the information, the information causes the processor 81 to perform the processing action of the second server in the above method embodiments, so that the transmitter 84 performs the transmitting action on the second server in the above method embodiments and the receiver 83 performs the receiving action on the second server in the above method embodiments. The implementation principles and technical effects are similar, and will not be repeated here.

An embodiment of the present disclosure also provides an Internet of Things system, including a client and a first server, and a second server, so as to perform the above Internet of Things communication method.

An embodiment of the present disclosure further provides a chip, including a processor and interfaces. Where the interfaces are configured to input and output data or instructions processed by the processor. The processor is configured to execute the method provided in the above method embodiments. The chip can be applied in the first server, the second server or the client.

The present disclosure further provides a computer-readable storage medium, the computer-readable storage medium may include: a U disk, a portable hard disk, a read-only memory (ROM), a random access memory (RAM), a disk or an optical disk and other mediums that can store program codes. Specifically, the computer-readable storage medium stores program information, the program information is used for the above Internet of Things communication method.

An embodiment of the present disclosure further provides a program, and the program, when executed by the processor, is used to execute the Internet of Things communication method provided by the above method embodiments.

An embodiment of the present disclosure further provides a program product, such as a computer-readable storage medium. The program product stores instructions which, when run on a computer, cause the computer to execute the Internet of Things communication method provided by the above method embodiments.

The above embodiments may be implemented in whole or in part by software, hardware, firmware, or any combination thereof. When being implemented using software, they may be implemented in whole or in part in the form of a computer program product. The computer program product includes one or more computer instructions. When the computer program instructions are loaded and executed on a computer, the whole process or functions or a part of the process or functions according to the embodiments of the present disclosure are generated. The computer may be a general purpose computer, a dedicated computer, a computer network, or other programmable apparatus. The computer instructions may be stored in a computer-readable storage medium, or transmitted from a computer-readable storage medium to another computer-readable storage medium. For example, the computer instructions may be transmitted from a website site, computer, server or data center in a wired manner (for example, a coaxial cable, an optical fiber, a digital subscriber line (DSL)) or in a wireless manner (for example, infrared, wireless, microwave, etc.) to another website site, computer, serving or data center. The computer-readable storage medium may be any available medium that can be accessed by a computer or a data storage device such as a serving or a data center that contains one or more available medium integrations. The available medium may be a magnetic medium, (for example, a floppy disk, a hard disk, a tape), an optical medium (for example, DVD), or a semiconductor medium (for example, a solid-state drives Solid State Disk (SSD)) and the like.

Finally, it should be noted that the foregoing embodiments are merely intended for describing the technical solutions of the present disclosure rather than limiting the present disclosure. Although the present disclosure is described in detail with reference to the foregoing embodiments, persons of ordinary skill in the art should understand that they may still make modifications to the technical solutions described in the foregoing embodiments or make equivalent substitutions to some or all technical features thereof, but these modifications or substitutions will not make the essence of the corresponding technical solutions depart from the scope of the embodiments of the present disclosure.

What is claimed is:

1. An Internet of Things communication method, applied to a first server, comprises:
   receiving a resource addition request transmitted by a client, the resource addition request being used to indicate addition of an identification of a reference resource into a collection resource on the first server;
   performing communication with the reference resource according to an access location of the reference resource and the identification of the reference resource;
   if the communication between the first server and the reference resource is successful, adding the identification of the reference resource into the collection resource; and
   if the communication between the first server and the reference resource fails, skipping adding the identification of the reference resource into the collection resource and transmitting an addition failure response to the client;
   wherein the method further comprises:
   determining that the resource addition request contains a remote link or a local link according to the access location of the reference resource or the identification of the reference resource;
   wherein performing communication with the reference resource according to the access location of the reference resource and the identification of the reference resource, comprises:
   if the resource addition request is the remote link, performing communication with the reference resource according to the access location of the reference resource and the identification of the reference resource; and
   if the resource addition request is the local link, performing verification to access to the reference resource.

2. The method according to claim 1, wherein performing communication with the reference resource according to the access location of the reference resource and the identification of the reference resource, comprises:
   establishing a communication connection between the first server and the reference resource according to the access location of the reference resource and the identification of the reference resource;
   performing communication with the reference resource according to the communication connection between the first server and the reference resource.

3. The method according to claim 1, wherein determining that the resource addition request contains the remote link or the local link, comprises:
   if the identification of the reference resource is different from an identification of the first server, determining that the resource addition request is the remote link; or,
   if the identification of the reference resource is the same as an identification of the first server, determining that the resource addition request is the local link.

4. The method according to claim 1, wherein determining that the resource addition request contains the remote link or the local link, comprises:
   if the access location of the first server does not contain the access location of the reference resource, determining that the resource addition request is the remote link; or,
   if the access location of the first server contains the access location of the reference resource, determining that the resource addition request is the local link.

5. The method according to claim 1, wherein the resource addition request contains the access location of the reference resource.

6. The method according to claim 1, wherein the method further comprises:
   if the resource addition request does not contain the access location of the reference resource, searching for the reference resource in a network to obtain the access location of the reference resource.

7. The method according to claim 1, wherein the resource addition request contains the identification of the reference resource.

8. An Internet of Things communication apparatus, comprising: a processor and a memory;
   the memory is configured to store a computer program, and the processor is configured to call and run the computer program stored in the memory to:
   control an interface to receive a resource addition request transmitted by a client, the resource addition request being used to indicate addition of an identification of a reference resource into a collection resource on the Internet of Things communication apparatus;
   perform communication with the reference resource according to an access location of the reference resource and the identification of the reference resource;
   if the communication between the Internet of Things communication apparatus and the reference resource is successful, add the identification of the reference resource into the collection resource; and
   if the communication between the Internet of Things communication apparatus and the reference resource fails, skip adding the identification of the reference resource into the collection resource and transmit an addition failure response to the client;

wherein the processor is further configured to:
determine that the resource addition request contains a remote link or a local link according to the access location of the reference resource or the identification of the reference resource;
if the resource addition request is the remote link, perform communication with the reference resource according to the access location of the reference resource and the identification of the reference resource; and
if the resource addition request is the local link, perform verification to access to the reference resource.

9. The apparatus according to claim 8, wherein the processor is configured to establish a communication connection between the Internet of Things communication apparatus and the reference resource according to the access location of the reference resource and the identification of the reference resource, and perform communication with the reference resource according to the communication connection between the Internet of Things communication apparatus and the reference resource.

10. The apparatus according to claim 8, wherein the processor is configured to determine that the resource addition request is the remote link if the identification of the reference resource is different from an identification of the Internet of Things communication apparatus, or, determine that the resource addition request is the local link if the identification of the reference resource is the same as an identification of the Internet of Things communication apparatus.

11. The apparatus according to claim 8, wherein the processor is configured to determine that the resource addition request is the remote link if the access location of the Internet of Things communication apparatus does not contain the access location of the reference resource, or, determine that the resource addition request is the local link if the access location of the Internet of Things communication apparatus contains the access location of the reference resource.

12. The apparatus according to claim 8, wherein the resource addition request contains the access location of the reference resource.

13. The apparatus according to claim 8, wherein the processor is further configured to search for the reference resource in a network to obtain the access location of the reference resource if the resource addition request does not contain the access location of the reference resource.

14. The apparatus according to claim 8, wherein the resource addition request contains the identification of the reference resource.

* * * * *